Aug. 12, 1947.  D. E. KENYON  2,425,330
CATHODE RAY SYSTEM WITH BRIGHT AND DARK MARKER INDICATIONS
Filed June 22, 1943
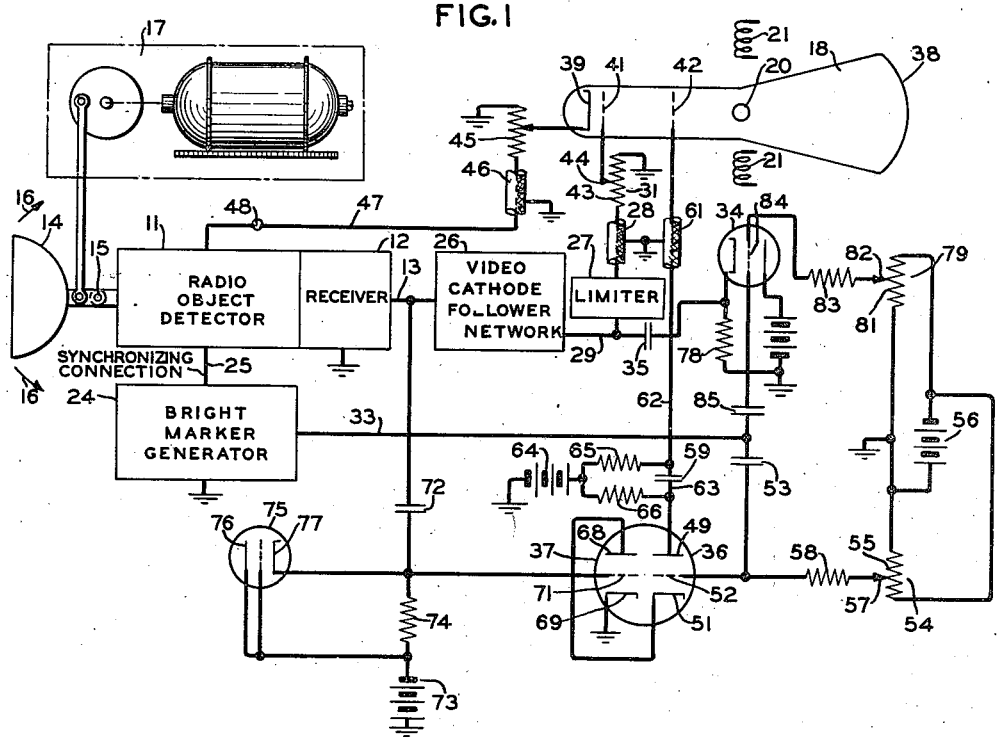
INVENTOR
DAVID E. KENYON
BY
HIS ATTORNEY Patented Aug. 12, 1947

2,425,330

UNITED STATES PATENT OFFICE 2,425,330

CATHODE-RAY SYSTEM WITH BRIGHT AND DARK MARKER INDICATIONS

David E. Kenyon, Smithtown, N. Y., assignor to Sperry Gyroscope Company, Inc., a corporation of New York Application June 22, 1943, Serial No. 491,766

14 Claims. (Cl. 315—22)

My invention relates to indicators, and concerns particularly graphic indicators of the type in which luminous traces are produced on a screen and scale divisions along an axis are indicated by characteristic luminous marks.

It is an object of my invention to provide an improved arrangement for indicating horizontal scale divisions on a fluorescent screen of a cathode ray tube. A specific object is to produce what I call "black-marker" indications under certain conditions instead of the previously proposed bright-marker indications.

My invention has generally for its object the improvement of pattern-tracing apparatus of the type employing a deflectible beam of radiant energy impinging on a screen, and an object is to increase the clarity of the indications.

A further object of my invention is to prevent confusion between background indications and marker indications. More specifically, an object of my invention is to make scale marker indications visible without regard to the existence of extraneous or background indications or the extent of video indications.

It is an object of my invention to provide a method for drawing a dark line through a luminous area on the screen of a cathode ray tube. It is also generally an object of my invention to provide a method for producing scale division lines on a cathode ray screen or the like and more particularly to provide a method to make the lines visible whether the screen is brightly illuminated or dark.

In certain types of object locating apparatus cathode ray tubes with fluorescent screens are employed as indicators. Graphic indications are produced on the fluorescent screen by the deflection of the cathode ray beam of the tube. It is considered preferable to utilize characteristic bright spots on the fluorescent screen instead of an external or printed scale for determining distances along an axis. Such marks are produced by means of bright marker generators acting upon the cathode ray beam and producing bright spots on the screen at predetermined intervals corresponding to deflection of the beam along the axis in question.

Under some conditions, however, difficulty is encountered from certain types of signal indications, such as ground reflections or very extensive target indications, for example, which produce a large substantially continuous area of illuminated spots, and thus make it difficult to distinguish the bright marker scale indications from the luminous area.

It is accordingly an object of my invention to provide means for substituting black marker scale indications for bright marker indications under conditions when such interfering luminous areas are produced.

A further object is to provide an arrangement whereby marker indications are automatically changed from bright marker to black marker indications, and vice versa, as the operating conditions change, so as to make one type of marker indication or the other more readily visible.

Other and further objects and advantages will become apparent as the description proceeds.

In carrying out my invention in accordance with a preferred form thereof, a cathode ray tube is arranged so as to be responsive to a video receiver for producing signal indications on its fluorescent screen, and also responsive to a black marker generator for producing horizontal scale marker indications on the fluorescent screen. In addition, means are provided for deenergizing the cathode ray tube or rendering the tube ineffective to produce luminous spots, and an inverter is interposed between the bright marker generator and such tube deenergizing means for deenergizing the tube and thereby producing black marks at the cathode ray beam positions at which bright marks would ordinarily be produced by the bright marker generator.

In order to cause the black marker indications to be produced only when strong signals are being received, a control device is interposed between the video receiver and the inverter for rendering the inverter effective only during such times as signals above a predetermined level are received.

A better understanding of the invention will be afforded by the following detailed description considered in connection with the accompanying drawings, wherein Fig. 1 is a circuit diagram, partially schematic, of one embodiment of my invention.

Fig. 2 is a diagram illustrating the appearance of the screen of the cathode ray indicator tube under certain illustrative conditions in which several islands are indicated as well as objects to be located.

Fig. 3 is a graph of C. R. beam current plotted against time for the period of vertical scan producing a single vertical line (3—3) of the pattern of Fig. 2 when no black markers are employed.

Fig. 4 is a graph corresponding to Fig. 3 with the effect of black markers shown.

Like reference characters are utilized throughout the drawings to designate like parts.

In microwave pulse type object locators, objects are detected by directing a series of pulses of microwave radiant energy in the direction in which the possible existence of an object is suspected and observing whether or not any pulses are returned, thus indicating the presence of an object serving to reflect the transmitted pulses. The apparatus for transmitting the microwave pulses and for receiving the reflected pulses is pivotally or rotatably mounted so as to scan an area which is to be patrolled, or in which objects are to be located. The location of the object is then determined by determining the angular position of the scanner at the instant when the reflections are received.

For indicating the location, an indicator of the cathode ray tube type may be employed in which reflected pulses produce luminous marks on the screen and the cathode ray beam is swept across the screen both vertically and horizontally in order to scan the entire surface. The beam is swept horizontally across the screen in accordance with the sweeping or scanning motion of the scanner so that the positions on the screen of the indications of reflected signals serve as indications of the angular positions of the detected objects. The beam is also swept vertically along the screen to represent distance or range. In order that stray magnetic fields and the position of the apparatus with respect to the earth's magnetic field will not effect the scale calibration by virtue of magnetic action on the cathode ray beam, as well as for other reasons, electrically produced range marker indications are used on the scale instead of an external or permanently printed or engraved scale on the screen.

Such a system is represented schematically in Fig. 1 of the drawings, wherein all of the apparatus for producing and transmitting microwave pulses and converting reflected pulses into video signals is represented schematically by a box 11, one portion 12 of which represents a receiver from which video signals are received through an output channel 13 represented schematically by a single line. The radio object detector apparatus 11 is represented as including a parabolic antenna or radiator and scanner 14, shown schematically as having a pivot axis 15 so that the scanner 14 may be moved back and forth in the directions indicated by the arrows 16 by suitable means such as a motor-driven mechanism 17 for sweeping an area to be patrolled. In the case of apparatus for detecting only surface objects, the scanner 14 may be arranged to have azimuthal motion only so as to sweep along the desired length of the horizon. For producing indications of the output of the receiver 12, one or more cathode ray tubes such as a tube 18 may be provided, according to the number of indicating stations desired.

For controlling the deflection of the cathode ray beam in one axis, for example the vertical axis, to represent range, each of the tubes 18 is provided with a cathode ray beam deflecting circuit including electrostatic deflection plates or magnetic deflection coils 20, and a synchronized sweep wave generator (not shown) is arranged to actuate such deflection circuits. Each tube has a second set of electrostatic deflection plates or coils 21 coupled in a manner (not shown) to the mechanical motion of the scanner 14 for sweeping the cathode ray beam along a second axis, in this case the horizontal axis, so that the distance along the horizontal scale of the cathode ray screen indicates angular position of the scanner and therefore angular position of an object detected by a reflected pulse.

For producing a scale on the cathode ray screen, a standard bright marker generator 24 is provided. The standard bright marker generator 24 is synchronized with the transmitter in the radio object detector 11 through a suitable electrical coupling, schematically represented by a line 25, so as to produce voltage impulses at regular intervals after each train of microwave oscillations is emitted by the scanner 14.

For actuating the cathode ray tube 18 in accordance with output of the receiver 12 from the channel 13, a connection is provided including a video cathode follower network 26, limiter 27, a cable 28, and a brilliance control potentiometer 31.

For coupling the bright marker generator 24 to the cathode ray tube 18 an electrical connection 33, a cathode follower stage 34, and a coupling condenser 35 are provided together with the previously mentioned elements 27, 28 and 31.

For producing black marker indications instead of bright marker indications an inverter 36 is provided which is interposed between the bright marker generator 24 and the tube 18. For controlling the inverter 36 in accordance with output from the receiver 12 a control device 37 is provided.

The cathode ray tube 18 comprises an evacuated envelope containing a fluorescent screen 38, one or more anodes and focussing electrodes or the like (not shown), a cathode 39, a control grid 41, and a second control element 42, which may take the form of an intensifier or screen grid or other suitable means for deenergizing or rendering the tube ineffective. The brightness control potentiometer 31 comprises a resistor 43 connected from the control grid 41 to a point of negative potential or ground and a slideable tap or brush 44. The brush 44 is connected to the end of the cables 28, which preferably has a grounded sheath.

For controlling the background level of the cathode ray trace a potentiometer 45 is provided which includes a tap connected to cathode 39 and a resistor connected between ground and the end of a grounded sheath cable 46, which is connected through a conductor 47 to a gate control terminal 48 in the radio object detector 11.

The inverter 36 is shown in the form of a triode and may be one element of a twin triode, the other element of which comprises the control device 37.

As shown, the inverter 36 includes an anode 49, a cathode 51, and a control electrode or grid 52. The control electrode 52 is coupled by means of a condenser 53 to the output channel 33 of the bright marker generator 24. For negatively biasing the grid 52 and adjustably controlling black marker gain, a potentiometer 54 is provided comprising a resistor 55 connected between ground and a source of negative potential 56, and having a sliding brush 57 connected to the grid 52 through a grid leak resistor 58.

For coupling the inverter anode 49 to the intensifier grid 42 of the cathode ray tube, a coupling condenser 59 is provided and the intensifier grid 42 is connected to the condenser 59 through cables 61 and conductors 62 and 63. For normally maintaining the intensifier grid 42 at a predetermined level of positive potential, a positive voltage source 64 is provided; and for dropping the voltage of the source 64 and coupling the tube 36 to grid 42 a resistor 65 is connected between the positive terminal 64 and the intensifier grid connection 62.

The inverter tube 36 may be provided with a conventional load resistor 66 connected to the positive terminal of source 64.

The control device 37 comprises an anode 68, a cathode 69, and a control electrode or grid 71. The grid 71 is coupled through a coupling condenser 72 to the output channel 13 of the receiver 12. The cathode 69 is grounded and thus connected to the negative terminal of the anode voltage supply source 64 and the anode 68 is connected to the cathode 51 of the inverter triode 36, so that the supply source 64 supplies the tubes 36 and 37 in series.

For negatively biasing the control grid 71, a source of negative potential 73 is provided to which the grid 71 is connected through a grid leak resistor 74. In order to prevent the control grid 71 from ever being driven more negative than the potential of the negative bias source 73, by negative peaks of the video output from the receiver 12, a direct current restorer is provided, which may take the form of a rectifier 75 connected across the grid leak resistor 74. The rectifier 75 may consist of a diode, or, as shown, a triode with the anode and grid connected together to form a diode.

It will be observed that the rectifier 75 has an anode 76 connected to the negative end of resistor 74 and a cathode 77 connected to the positive end thereof.

The cathode follower stage 34 for coupling the marker generator 24 to the cathode ray tube grids 41 may comprise a triode conventionally connected with an output resistor 78 in the cathode lead thereof, the coupling condenser 35 being connected between the cathode end of the resistor 78 and the connection 29 from the video cathode follower network 26.

For controlling the bright marker gain the cathode follower 34 is adjustably biased. An adjustable bias source 79 is provided consisting of a resistor 81 connected between ground and a source of negative potential 56, and an adjustable tap or brush 82 connected through a resistor 83 to a control electrode or grid 84 of the cathode follower tube 34. The control grid 84 is coupled through a condenser 85 to the output channel 33 of the bright marker generator 24.

A pattern is produced on the screen 38 of the cathode ray tube by sweeping a cathode ray beam across the screen with both horizontal and vertical scanning motions and energizing the tube sufficiently to illuminate the screen only when the beam is in the position at which the illumination is desired on the screen. For example, as illustrated in Fig. 2, the screen 38 is represented as having a rectangular area 91 within which a pattern or patterns may be produced representing targets or objects intercepted by a microwave beam transmitted from the microwave pulse scanner 14. Certain areas 92, shown as cross-hatched represent targets, islands, ships, airplanes, icebergs, or other objects within the range of detection of the apparatus of Fig. 1. The areas 92 are luminous, whereas the remainder of the screen within the rectangle 91 is dark or has only a relatively faint background illumination according to the setting of the potentiometer 45 (Fig. 1). The beam is swept horizontally at a relatively slow rate by the horizontal deflection coil 21 and is swept vertically at a relatively high rate by the vertical deflection coil 20.

The luminous areas result from the fact that during the instants of time that the beam deflection conditions are correct for electron beam impingement on the portion of the screen 38 of the cathode ray tube 18 within these areas, the control grid 41 is energized sufficiently by the video output of the receiver 12 to illuminate the screen 38. Thus, the pattern is produced on the screen by the beam making a series of vertical traces across the screen and either illuminating the screen or leaving it dark according to the voltage applied to the control grids 41. For example, when the horizontal sweep has carried the beam to the azimuth position represented by the arrows 3—3, the voltage applied to the grids 41 varies with time in the manner illustrated by the graph of Fig. 3.

The horizontal or time axis of Fig. 3 corresponds to the vertical or distance axis of Fig. 2, since the time required for energy to travel to a reflecting object and return is proportional to the distance to the object from the scanner 14. Unless the pulse produced by the transmitter in the radio object detector 11 is cut out from the receiver, the receiver 12 will produce a video output signal when the pulse is transmitted. Such a direct pick-up is however assumed to have been eliminated from the video input to the cathode ray tube by the provision of a cathode ray gate from the terminal 48 and therefore no corresponding indication appears in Figs. 2–4.

If the apparatus is used at sea, a few microseconds after the emission of a pulse or train of microwave oscillations, the video voltage will rise momentarily as shown at 94 in Fig. 3, representing a train of microwave pulses reflected from the surface of the ocean immediately in front of the apparatus 11 of Fig. 1. This is indicated in Fig. 2 by a dotted line 95 and called the "sea return." Since the receiver 12 serves as a demodulator, only the modulation envelope of the train of microwave oscillations appears in the wave form 94.

If an island of considerable extent covering a distance from about 1½ miles to 2$\frac{8}{10}$ miles from the transmitter, for example, intercepts the train of emitted microwave oscillations, corresponding signals will be reflected from the island for a period of time. Thus when the transmitted oscillations first strike the closest portion of the island, reflected signals will start returning toward the radio object detector 11 and be picked up by the scanner 14. As the transmitted oscillations reach more and more distant portions of such an island, additional reflections start returning toward the radio object detector, but owing to the time delay involved in traveling to and from the successively more distant parts of the island, the reflected oscillations will continue to be received by the radio object detector 11 for an appreciable period of time. When the microwave radio frequency voltage is demodulated by the receiver 12, the video voltage output of the receiver 12 will have the form shown by the portion 96 of the curve in Fig. 3. The voltage 96 appears as a line 97, 98 in one of the areas 92A of Fig. 2.

As represented in Fig. 3, this video voltage persists from an instant about 12 microseconds after the transmitted pulse to about 35 microseconds after the transmitted pulse. This time interval represents the difference between twice the length of time for a microwave signal to traverse the distance from the transmitter to the nearest point of the island and twice the time required to traverse the distance to the farthest point of the island delineated by the line 97, 98 in Fig. 2. The length of the line 97, 98 therefore represents the length of the island, and the distances from the zero line 19 to the points 97 and 98 in Fig. 2 represent the distances from the radio object detector 11 to the nearest and farthest points, respectively, of the island which has been detected. In a similar manner, if a second island is intercepted by the transmitted microwave beam while the cathode ray beam is still being swept vertically along the line 3—3 of Fig. 2, the video voltage will rise again, as represented by the portion 99 of the curve of Fig. 3, and a bright line 101, 102 will be traced on the screen 38 of Fig. 2.

When the cathode ram beam makes its next vertical sweep, the horizontal sweep coils will have moved the beam slightly to one side. Consequently, successive vertical sweeps produce lines corresponding to the lines 97, 98 and 101, 102 so as to produce the luminous areas 92A and 92B in Fig. 2. Other islands or detected objects are indicated by the other illuminated areas 92 of Fig. 2. It will be understood that if a navigator is supplied with a chart of the portion of the sea in which he is navigating, he will recognize the bright areas corresponding to islands, and if any additional spot not corresponding to charted obstructions is observed, such as a spot 92C, for example, the navigator will recognize it as an indication of the presence of an obstruction to navigation, a hostile ship, aircraft, or the like.

The screen 38 is provided with a horizontal scale graduated in degrees to designate angles in azimuth at which the various detected obstructions are located and is also provided with a vertical scale graduated in terms of range. For example, the range graduations may cover the region from zero to five miles where the length of the horizontal axis of Fig. 3 covers a time duration of approximately 60 microseconds, the time required for radio energy to travel to and from an object five miles distant.

In order to facilitate reading the range, it is desirable to produce on the screen 38 horizontal graduation lines or range markers 104. These may be produced by a bright marker generator such as shown at 24 in Fig. 1, which produces momentary voltage impulses such as those indicated by the reference numerals 105, 106, 107, 108 and 109 in Fig. 3. Ordinarily, the receiver 12 includes suitable limiting circuits so that the voltage curve of Fig. 3 has a substantially constant maximum value producing a flat top or series of flat tops. The bright marker generator 24 may be so connected that the voltage impulses 105, and so forth, are superimposed on the video output of the channel 13 of the receiver 12. However, even if this is done, the added brightness of the screen may not be sufficient to produce clear range marker lines through extensive illuminated areas, such as the areas 92A and 92D.

Thus, in Fig. 3 the marker impulses 105, 107 and 109 fall in clear areas so as to produce bright spots which result in luminous lines 104 being drawn horizontally across the screen 38 as the beam is swept horizontally. It will be understood that the persistence of vision or of the fluorescent screen material causes the marker lines to appear as continuous lines, though the bright spot is actually at only one point of the screen at a given instant. On the other hand, the marker impulses 106 and 108 which occur during the long voltage pulse areas 96 and 99 of the curve of Fig. 3 are substantially obliterated and are therefore represented by dotted lines in Fig. 3. The limiter 27 gives the waves of Fig. 3 a uniform maximum height.

In order to produce range markers which will be distinguishable from the luminous areas 92 when they fall within the areas 92, the apparatus may be modified so as to produce a curve such as shown in Fig. 4, for example. In this case the cathode ray tube is so operated that, in effect, the bright markers 106 and 108 of Fig. 3 are reversed, as represented by negative impulses 111 and 112 in Fig. 4, which decrease the C. R. beam current and therefore produce black markers instead of bright markers whenever the bright marker impulses occur during video voltage impulses, such as the impulses 96 and 99. It will be understood that Fig. 4 is symbolical, and that my invention is not limited to producing black markers by actually decreasing the video voltage to reduce C. R. beam current. As illustrated in Fig. 1, such an effect may be produced instead by deenergizing the cathode ray tube 18 at given instants when black markers are to be produced by impressing negative black marker impulses on the screen grid or intensifier grid 42 instead of superimposing such impulses on the control grid 41. Nevertheless, the effect represented by Fig. 4 is accomplished because at the instants of the black marker pulses 111 and 112, the cathode ray tube is deenergized so as to darken the screen 38 of the tube and thereby cause dark lines 113 and 114 drawn through the luminous areas 92A and 92B, as well as causing similar dark line segments to be drawn through the other luminous areas when intersected by one of the range markers 104.

Referring to Fig. 1, it will be observed that the bright marker pulses from the bright marker generator 24 are inverted by the tube 36, so that when the tube 36 is functioning a negative impulse is applied to the intensifier grid 42 at each instant corresponding to a bright marker indication. Since the functioning of the cathode ray tube depends upon energization by intensifier grid 42, the deenergization of this grid deenergizes the tube or renders it ineffective so that the cathode ray beam is momentarily cut off and black marker indications instead of bright marker indications are produced along the range markers 104 in Fig. 2.

Although the invention has been described in connection with a system having means for producing range markers and not producing azimuth markers it will be understood that my invention is not limited thereto and embraces the use of black markers instead of bright markers when required by operating conditions regardless of the dimensions indicated or the use to which the bright markers are put.

The control device 37 serves to switch the apparatus automatically from bright marker to black marker indications and vice versa as operating conditions change to require a change in markers. Thus, whenever video signals are received, the control tube becomes conducting and provides a ground connection for the cathode 51 of the inverter tube rendering the inverter tube effective and causing the black marker pulses to be supplied to the intensifier grids 42.

On the other hand, when there are no video signals or when the video signals are below the level represented by the bias of the control tube 37, indicating that relatively little energy is being received from the receiver 12, the tube 37 has substantially infinite impedance. Under these conditions, the cathode 51 of the inverter tube 36 floats at relatively high potential and no pulses are transmitted to the intensifier grid 42.

The video-cathode follower network 26 provides low impedance input to the cathode ray grid circuits and prevents reaction upon the receiver 12 and interference with the control tube 37 by pulses from the bright marker generator 24. Likewise the cathode follower stage 34 provides low output impedance.

In accordance with the provisions of the patent statutes I have described the principle of operation of my invention together with the apparatus, which I now consider to represent the best embodiment thereof, but I desire to have it understood that the apparatus shown is only illustrative and that the invention may be carried out by other means.

What is claimed is:

1. An object locator comprising, in combination with a radio detection system, a radio receiver, a cathode ray oscilloscope responsive to the receiver, a standard marker generator for supplying the cathode ray oscilloscope with scale marker indications, an inverter coupled to said marker generator, and means coupling the cathode ray oscilloscope to said inverter for rendering the cathode ray oscilloscope momentarily ineffective in response to an output signal from said generator during a period of receiver output.

2. An object locator comprising, in combination with a radio detection system, a radio receiver, a cathode ray oscilloscope responsive to the receiver, a standard marker generator for supplying the cathode ray oscilloscope with scale marker indications, an inverter coupled to said marker generator, means operable by said inverter for rendering said oscilloscope ineffective, and means responsive to the receiver output for controlling said inverter and rendering it effective only during the existence of output from the receiver.

3. A black marker generator for use with a radio detector system subject to marker masking indications having a receiver, a cathode ray oscilloscope responsive to the receiver and a standard marker generator supplying modulated impulses to the cathode ray oscilloscope, said black marker generator comprising means responsive to said generator for deenergizing said oscilloscope, and control means interposed between said receiver and said deenergizing means for rendering said latter means effective only during the existence of output from said receiver.

4. In combination, a cathode ray oscilloscope having a control grid and an intensifier grid, a video receiver coupled to the control grid, a marker generator also coupled to the control grid, control means responsive to receiver output, and an inverter interposed between said control means and said intensifier grid for deenergizing said intensifier grid during the existence of receiver output to produce black marker impulses to contrast with video indications.

5. Apparatus as set forth in claim 4, in which the control means comprises a triode vacuum tube with a control grid, means for biasing said grid beyond negative cut-off, and means for preventing the application of negative signals to said grid.

6. An object locator comprising a detection system including a radio receiver, a cathode ray tube with a screen adapted to be illuminated at a spot where a cathode ray impinges, a bright marker generator coupled to said tube, means responsive to said generator for diminishing brightness, and means responsive to said receiver for controlling said brightness-diminishing means.

7. An object locator comprising a detection system, an indicator or tracing means with a screen adapted to be illuminated along a trace, a bright marker generator coupled to said indicator, means to produce a bright marker trace thereon, for reversing the action of said generator on said indicator to produce a dark marker trace thereon, and means responsive to output from said detection system for controlling said previously mentioned means.

8. An object locator comprising a detection system, an indicator or tracing means with a screen adapted to be illuminated along a trace, said indicator or tracing means being coupled to said detection system for producing areas of contrasting illumination on said screen, a bright marker generator coupled to said indicator to produce a trace thereon, and means for reversing the action of said generator on said indicator, whereby said trace is illuminated in contrast with said screen areas.

9. A black marker generator for a cathode ray tube comprising a bright marker generator coupled to said tube for producing a bright trace therein and an inverter responsive to said bright marker generator and operative on said cathode ray tube for producing a dark trace therein.

10. A black marker generator for a cathode ray tube comprising a pulse generator coupled to said cathode ray tube through an intensifier channel and also through an intensity-reducer channel, and a receiver-responsive control for said generator for rendering said intensity-reducer channel operative in accordance with the received signals.

11. In combination, a cathode ray tube a signal source coupled to said tube for producing a pattern thereon, and a marker generator coupled to said tube for supplying marker signals therein, and means for deenergizing the tube in accordance with simultaneous signals from said marker generator and said signal source.

12. A method of drawing a dark line through an illuminated portion of the screen of a cathode ray tube, which comprises the steps of generating marker impulses synchronized with beam deflection through said line, and deenergizing the cathode ray tube electron beam in response to such impulses.

13. A method of producing scale markers on the screen of a cathode ray tube which will be visible in either dark or illuminated portions of the screen, which method comprises the steps of energizing the cathode ray tube in response to video signals for producing a pattern on the screen, generating marker impulses, applying said impulses to the cathode ray tube for producing bright markers, inverting said bright marker pulses, deenergizing the tube by said inverted pulses to produce black markers, and rendering said inverter effective or ineffective in response to the magnitude of the video input to the tube for preventing the production of bright markers and causing the production of black markers only when the video input exceeds a predetermined level.

14. The method of producing a luminous pattern on the screen of a cathode ray tube together with scale markers, which method comprises energizing a tube in accordance with video signals to be indicated on the screen, generating marker impulses, and selectively energizing or deenergizing said tube in response to said marker impulses according to whether the video signal input level is above or below a predetermined level.

DAVID E. KENYON.

REFERENCES CITED

The following references are of record in the file of this patent:

UNITED STATES PATENTS

| Number | Name | Date |
| --- | --- | --- |
| 2,121,359 | Luck et al. | June 21, 1938 |
| 2,137,262 | Bowman-Manifold | Nov. 22, 1938 |
| 2,227,197 | Percival | Dec. 31, 1940 |
| 2,275,460 | Page | Mar. 10, 1942 |
| 2,285,043 | Messner | June 2, 1942 |
| 2,313,967 | Read, Jr. | Mar. 16, 1943 |
| 2,227,492 | C. L. Faudell et al. | Jan. 7, 1941 |
| 2,255,484 | R. B. Dome | Sept. 9, 1941 |
| 2,255,485 | R. B. Dome | Sept. 9, 1941 |